US009707968B2

United States Patent
Wall et al.

(10) Patent No.: US 9,707,968 B2
(45) Date of Patent: Jul. 18, 2017

(54) POWERTRAIN CONTROLS INCLUDING TRANSIENT TORQUE MANAGEMENT WITH DYNAMIC RELEASE COMPENSATION

(71) Applicant: Cummins Inc., Columbus, IN (US)

(72) Inventors: John Carson Wall, Columbus, IN (US); Vivek Anand Sujan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 131 days.

(21) Appl. No.: 14/456,681

(22) Filed: Aug. 11, 2014

(65) Prior Publication Data

US 2016/0039418 A1    Feb. 11, 2016

(51) Int. Cl.

| | |
|---|---|
| *B60W 30/188* | (2012.01) |
| *B60W 50/12* | (2012.01) |
| *B60W 10/06* | (2006.01) |
| *B60W 50/06* | (2006.01) |
| *B60W 30/19* | (2012.01) |

(52) U.S. Cl.
CPC ........ *B60W 30/1882* (2013.01); *B60W 10/06* (2013.01); *B60W 30/19* (2013.01); *B60W 50/06* (2013.01); *B60W 50/12* (2013.01); *B60W 2710/0644* (2013.01); *Y02T 10/56* (2013.01)

(58) Field of Classification Search
CPC ...... B60W 10/06; B60W 40/00; B60W 40/06; B60W 40/076; B60W 30/143; B60W 2050/0089; B60W 50/0097; B60W 50/12; B60W 30/1882; B60W 30/19; B60W 50/06; B60W 2710/0644; Y02T 10/56

See application file for complete search history.

(56) References Cited

U.S. PATENT DOCUMENTS

| | | | |
|---|---|---|---|
| 5,868,214 A | 2/1999 | Workman | |
| 6,209,672 B1 * | 4/2001 | Severinsky | B60K 6/442 180/65.23 |
| 6,269,296 B1 * | 7/2001 | Toukura | B60W 10/06 701/65 |
| 6,398,692 B1 * | 6/2002 | Isaac | B60K 28/16 123/486 |

(Continued)

FOREIGN PATENT DOCUMENTS

WO    2011137913    11/2011

*Primary Examiner* — Thomas G Black
*Assistant Examiner* — Sze-Hon Kong
(74) *Attorney, Agent, or Firm* — Taft Stettinius & Hollister LLP

(57) ABSTRACT

One exemplary embodiment is a method of controlling a vehicle system including an engine, a transmission, and a control system in operative communication with and structured to control operation of the engine and the transmission. The method determines an operating point of the engine including an engine torque and an engine speed and evaluates a relationship between the operating point and a soft limit on engine torque. The method modifies the soft limit to permit operation outside a boundary of the un-modified soft limit. Modification of the soft limit is constrained by a non-adjustable limit. The operating point of the engine is adjusted to increase engine torque above the boundary of the un-modified soft limit. The method may mitigate a vehicle speed lug event and/or avoid a transmission shift event.

31 Claims, 8 Drawing Sheets

(56) References Cited

U.S. PATENT DOCUMENTS

| | | | |
|---|---|---|---|
| 7,877,185 B2* | 1/2011 | Roudeau | B60W 30/18 701/58 |
| 8,175,790 B2 | 5/2012 | Stemler et al. | |
| 8,340,882 B2* | 12/2012 | Kim | F02D 29/02 701/110 |
| 2001/0035049 A1* | 11/2001 | Balch | B60L 3/10 73/488 |
| 2010/0234171 A1* | 9/2010 | Tanba | B60K 6/387 477/5 |
| 2011/0106388 A1* | 5/2011 | Boeckenhoff | B60W 10/06 701/70 |
| 2012/0203406 A1* | 8/2012 | Akebono | B60W 10/02 701/22 |
| 2012/0232731 A1* | 9/2012 | Sujan | B60W 10/06 701/22 |
| 2012/0310455 A1* | 12/2012 | Arnett | B60W 20/00 701/22 |
| 2013/0179044 A1* | 7/2013 | Ishikawa | B60W 10/11 701/53 |
| 2013/0211686 A1* | 8/2013 | Shono | B60K 6/445 701/70 |
| 2013/0211695 A1* | 8/2013 | Bjernetun | B60W 10/06 701/110 |
| 2013/0297174 A1* | 11/2013 | Lacaze | B60W 30/143 701/94 |
| 2014/0088810 A1* | 3/2014 | Gehring | B60W 10/06 701/22 |
| 2014/0163799 A1* | 6/2014 | Niimi | B60K 6/445 701/22 |
| 2014/0229081 A1* | 8/2014 | Iwase | F16H 59/66 701/51 |
| 2014/0287873 A1* | 9/2014 | Okamura | B60W 10/06 477/92 |
| 2014/0335994 A1* | 11/2014 | Otake | B60W 10/06 477/3 |
| 2014/0336886 A1* | 11/2014 | Rayala | B60W 10/06 701/53 |
| 2015/0066265 A1* | 3/2015 | Martin | B60W 20/15 701/22 |
| 2015/0158498 A1* | 6/2015 | Jeon | B60W 50/10 701/101 |
| 2015/0203117 A1* | 7/2015 | Kelly | B60K 31/02 701/91 |
| 2015/0210282 A1* | 7/2015 | Fairgrieve | B60W 30/143 701/93 |
| 2015/0239454 A1* | 8/2015 | Sujan | F02D 41/1401 701/54 |
| 2015/0291176 A1* | 10/2015 | Jeong | G01C 9/08 701/468 |
| 2015/0361915 A1* | 12/2015 | Sujan | F02D 41/24 701/54 |
| 2016/0016525 A1* | 1/2016 | Chauncey | B60R 16/0236 701/123 |

* cited by examiner

POWERTRAIN CONTROLS INCLUDING TRANSIENT TORQUE MANAGEMENT WITH DYNAMIC RELEASE COMPENSATION

BACKGROUND

The present application relates generally to powertrain controls providing drive cycle efficiency and responsiveness enhancement and optimization, and more particularly but not exclusively to powertrain controls including transient torque management with dynamic release compensation. Controls for operation of a vehicle system including an internal combustion engine and a transmission face a number of challenges, including fuel consumption, responsiveness to operator control inputs (including perceived responsiveness sometimes referred to as drivability), protection of system components from acute failure modes, and mitigating wear of and extending life of system components, among others. Conventional approaches to powertrain controls suffer from a number limitations and shortcomings including those respecting drive cycle efficiency and responsiveness. There remains a significant need for the apparatuses, controls, methods, systems and techniques disclosed herein.

DISCLOSURE OF ILLUSTRATIVE EMBODIMENTS

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

Exemplary embodiments include unique apparatuses, methods and systems of controlling a vehicle system including an engine, a transmission, and a control system in operative communication with and structured to control operation of the engine and the transmission. One exemplary method determines an operating point of the engine including an engine torque and an engine speed, evaluates a relationship between the operating point and a soft limit on engine torque, and modifies the soft limit to permit operation outside a boundary of the un-modified soft limit. Modification of the soft limit may be constrained by a non-adjustable limit. The operating point of the engine may be adjusted to increase engine torque above the boundary of the un-modified soft limit. In certain forms the method is effective to mitigate a vehicle speed lug event and/or avoid a transmission shift event. Further embodiments, forms, objects, features, advantages, aspects, and benefits shall become apparent from the following description and drawings.

DETAILED DESCRIPTION OF ILLUSTRATIVE EMBODIMENTS

Figure 1:
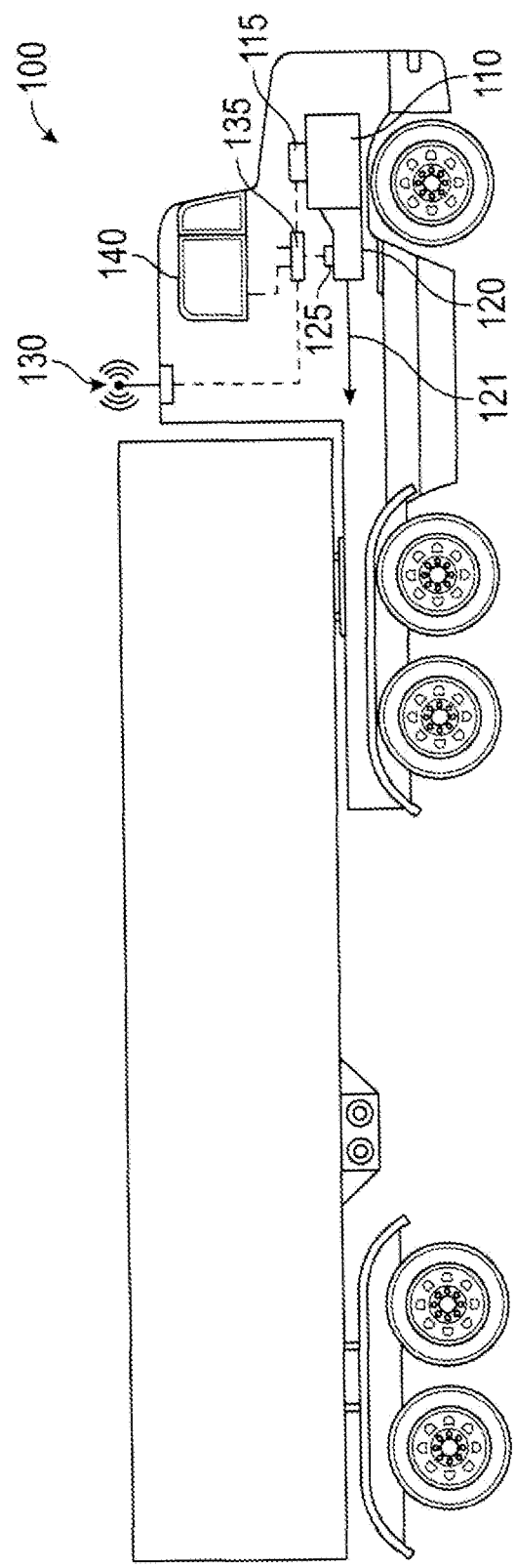
FIG. 1 is a schematic diagram illustrating an exemplary vehicle system.

With reference to FIG. 1 there is illustrated an exemplary vehicle 100 including an internal combustion engine 110 configured to output torque to a transmission 120 which is, in turn, configured to output torque to a drive shaft 121. In the illustrated embodiment vehicle 100 is depicted as a heavy duty on-highway truck, however, it shall be appreciated that a variety of different types of vehicles are also contemplated. Non-limiting examples of these include on-highway vehicles, off-highway vehicles, construction equipment, mining trucks, buses, and passenger vehicles, among others. It shall be further appreciated that engine 110 may be provided in a variety of forms. In the illustrated embodiment, engine 110 is configured as a compression ignition internal combustion engine with turbocharged air intake system and exhaust aftertreatment system. In certain embodiments engine 110 may be provided as one component in a hybrid powertrain. Transmission 120 may also be provided in a variety of forms including, for example, automatic transmissions, manual transmissions, and automated manual transmissions.

Vehicle system 100 further includes a control system comprising engine control module 115, transmission control module 125, and vehicle control module 135 which are configured to communicate with one another as well as with engine, transmission, and vehicle sensors via a controller-area network (CAN). Engine control module 115 may be configured to implement a plurality of controls for vehicle system 100 including cycle efficiency management (CEM) controls such as those disclosed herein as well as a variety of other controls relating to engine 110. Transmission control module 115 is configured to control and monitor transmission 125. Vehicle control module 135 is configured to receive input from operator controls 140 which may include an accelerator pedal, a brake pedal, and a parking brake control, among other controls. It is contemplated that various other operator controls may be used depending upon the particular type of vehicle chassis which is utilized and the particular arrangement of the operator cabin. Vehicle control module 135 is further configured to receive input from telematics system 130 which may be provided, for example, as a global positioning system (GPS), wireless communication networks such as cellular, Wi-Fi, and other networks configured to provide input relating to location or position.

It shall be appreciated that the controls described herein may also be implemented in connection with a variety of additional or alternate control systems including the alternative configurations disclosed herein. The illustrated control modules and their respective functionalities may be reconfigured, redistributed, supplemented, or combined. It shall also be appreciated that the controls described in the present application may be implemented in various combinations of hardware, firmware and/or software which may be provided in a single microprocessor based controller or control module or in a plurality of microprocessor based controllers or control modules such as a distributed controller system in which a plurality of controllers communicate via a CAN.

Figure 2:
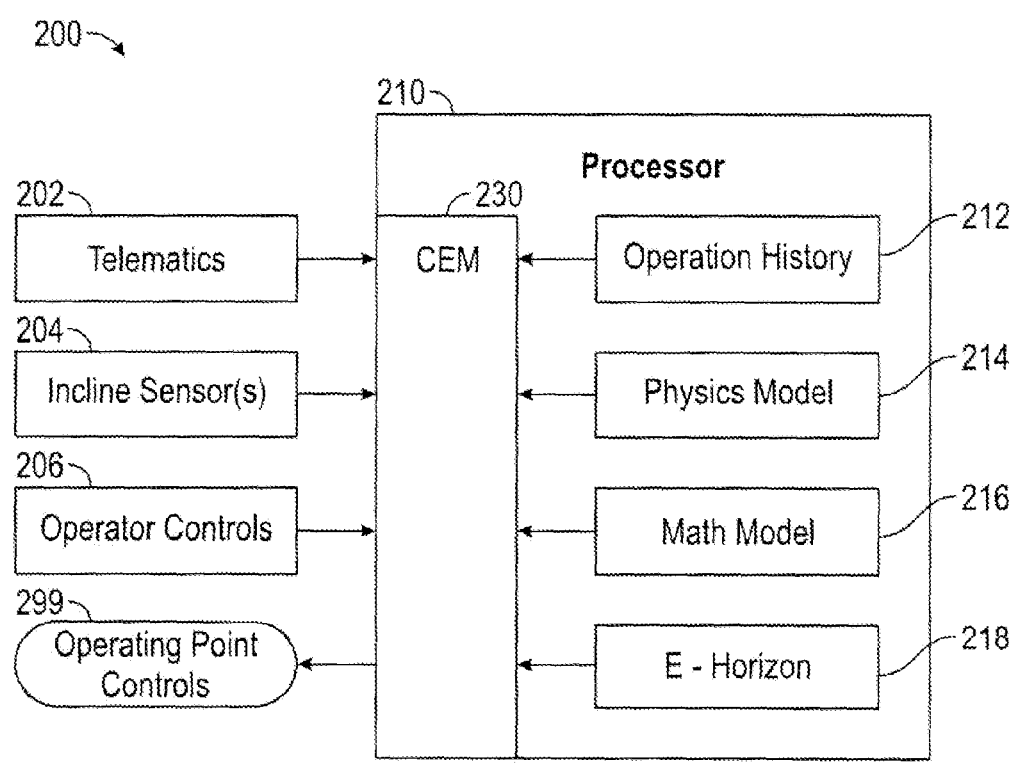
FIG. 2 is a schematic diagram illustrating an exemplary control module.

With reference to FIG. 2 there is illustrated a block diagram of exemplary control module 200. Control module 200 includes a processor 210 which is structured to execute cycle efficiency management controls 230 as well as a variety of additional and alternate controls. A variety of external inputs may be provided to processor 210. In the illustrated embodiments, the inputs comprise telematics input 202, incline sensor input 204, and operator controls input 206. Processor 210 also makes a number of internal determinations which may be used as inputs to CEM controls 230. The inputs may include any of an operation history input 212, a physics model input 214, a map model 216, and an E-horizon input 218.

CEM controls 230 may be provided in a variety of forms. In an exemplary embodiment CEM controls may be structured to provide vehicle speed management, torque management, cycle management and parasitic management functionalities. Exemplary vehicle speed management controls may actively manipulate a vehicle speed profile to reduce fuel consumption over the course of a mission. Exemplary torque management controls may manage the available torque, engine speed, or power based upon an estimated demand to reduce fuel consumption. Exemplary cycle management controls may allow a vehicle operator to make strategic decisions about mission parameters for reducing fuel consumption including, for example, decisions about vehicle cruise set point and fuel refill recommendations among others. Exemplary parasitic management controls may utilize information relating to vehicle and mission parameters to more efficiently control parasitic devices to mitigate reduce fuel consumption. It shall be appreciated that these and other CEM-related controls may be implemented in a variety of control systems including, for example, the control system of vehicle 100 described above in connection with FIG. 1.

Figure 3:
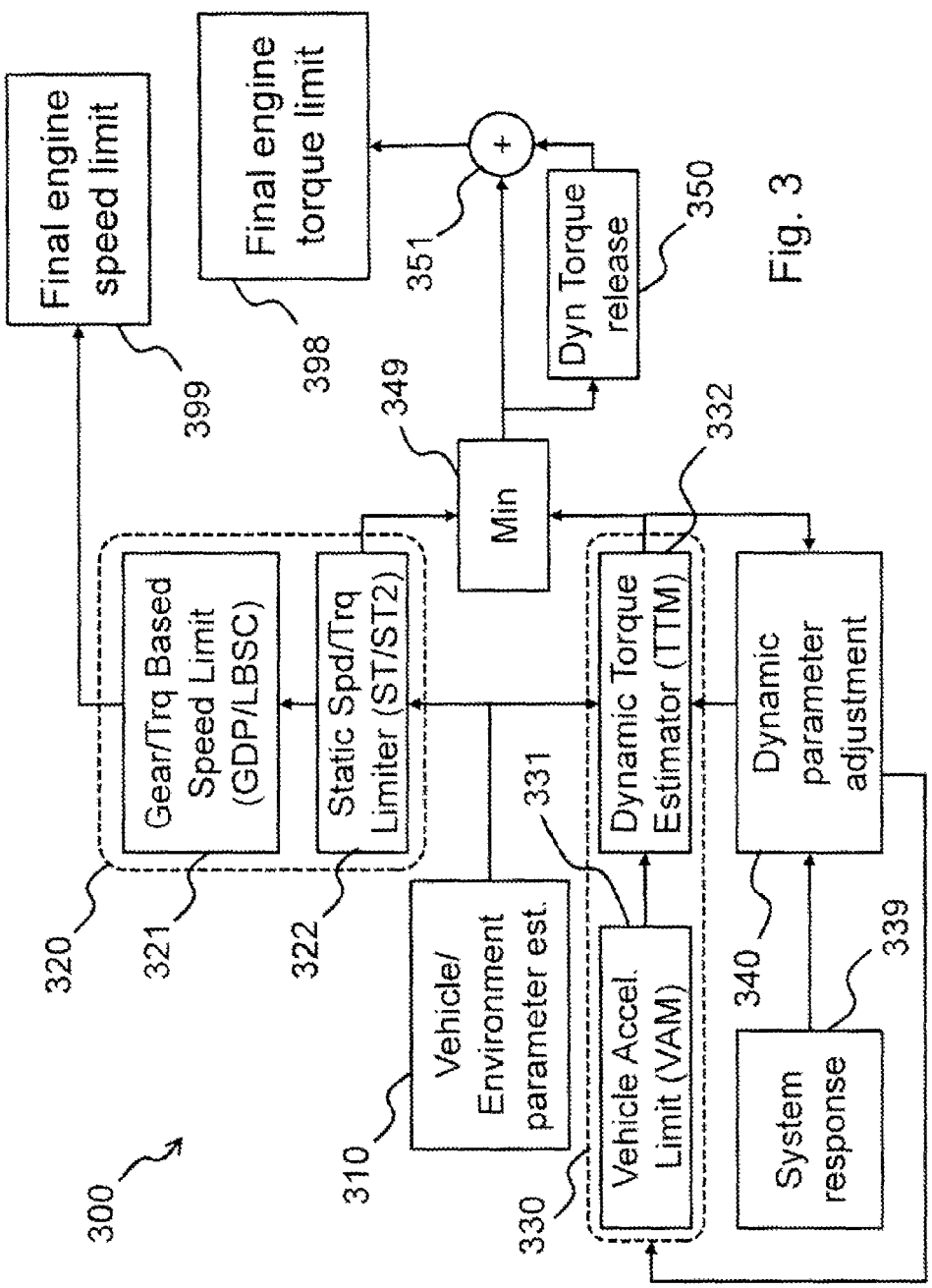
FIGS. 3-4 are block diagrams illustrating aspects of exemplary controls.

With reference to FIG. 3 there is illustrated a block diagram of exemplary CEM controls 300. Controls 300 include a vehicle and environment parameter estimation module 310 which provides a set of model coefficients including vehicle parameters and environmental parameters which may be used by other control modules or routines. The vehicle parameters may include mass, aerodynamic drag coefficient, rolling resistance coefficients, powertrain efficiencies and inertias, key gear ratios, and vehicle velocity and acceleration parameters. The environmental parameters may include road grade, air pressure and air temperature. Vehicle and environment parameter estimation module 310 may determine vehicle parameters and environmental parameters based upon information stored in a non-transitory controller-readable medium which may be predetermined information or which may be calculated at various points in time or a combination thereof. Vehicle and environment parameter estimation module 310 may also receive input from dynamic parameter adjustment module 340 and may utilize that input in adjusting or determining vehicle parameters and environmental parameters. Dynamic parameter adjustment module 340 may correct the vehicle parameters to better fit the dynamic model with the true system characteristic based on system response input 339 and input from dynamic torque estimator 332. The vehicle parameters and environmental parameters determined by vehicle and environment parameter estimator 310 are provided to static torque transient management module 320 and dynamic torque transient management module 330.

Static torque transient management module 320 includes static speed/torque limiter 322 and gear/torque based speed limiter 321. Static speed/torque limiter 322 determines how much torque and speed the engine can produce as a function of gear, road grade and vehicle mass. This is preferably based on a pre-calibrated look-up-table rather than being changeable based on application and installation although both options are contemplated. Module 322 outputs this value to operator 349 and to gear/torque based speed limiter 321. Gear/torque based speed limiter 321 determines a final engine speed limit based on the output of the speed/torque limiter 322 and gear ratio and current engine load information and provides this value to final engine speed limit variable 399.

Dynamic torque transient management module 330 includes vehicle acceleration limiter 331 which provides a vehicle acceleration limit as a function of vehicle speed and dynamic torque estimator 332 which determines a torque requirement for a commanded vehicle operating state and outputs this value to operator 349 and to dynamic parameter adjustment module 340.

Operator 349 determines the minimum of the values it receives from static torque estimator 322 and dynamic torque estimator 332 and outputs this value to dynamic torque release module 350 and to operator 351. Dynamic torque release module 350 determines an torque limit adjustment, for example, using the techniques described herein below. The output of dynamic torque release module 350 is provided to operator 351 which sums that output with the output of operator 349 to determine a final engine torque limit and provides this value to final engine torque limit variable 398.

Figure 4:
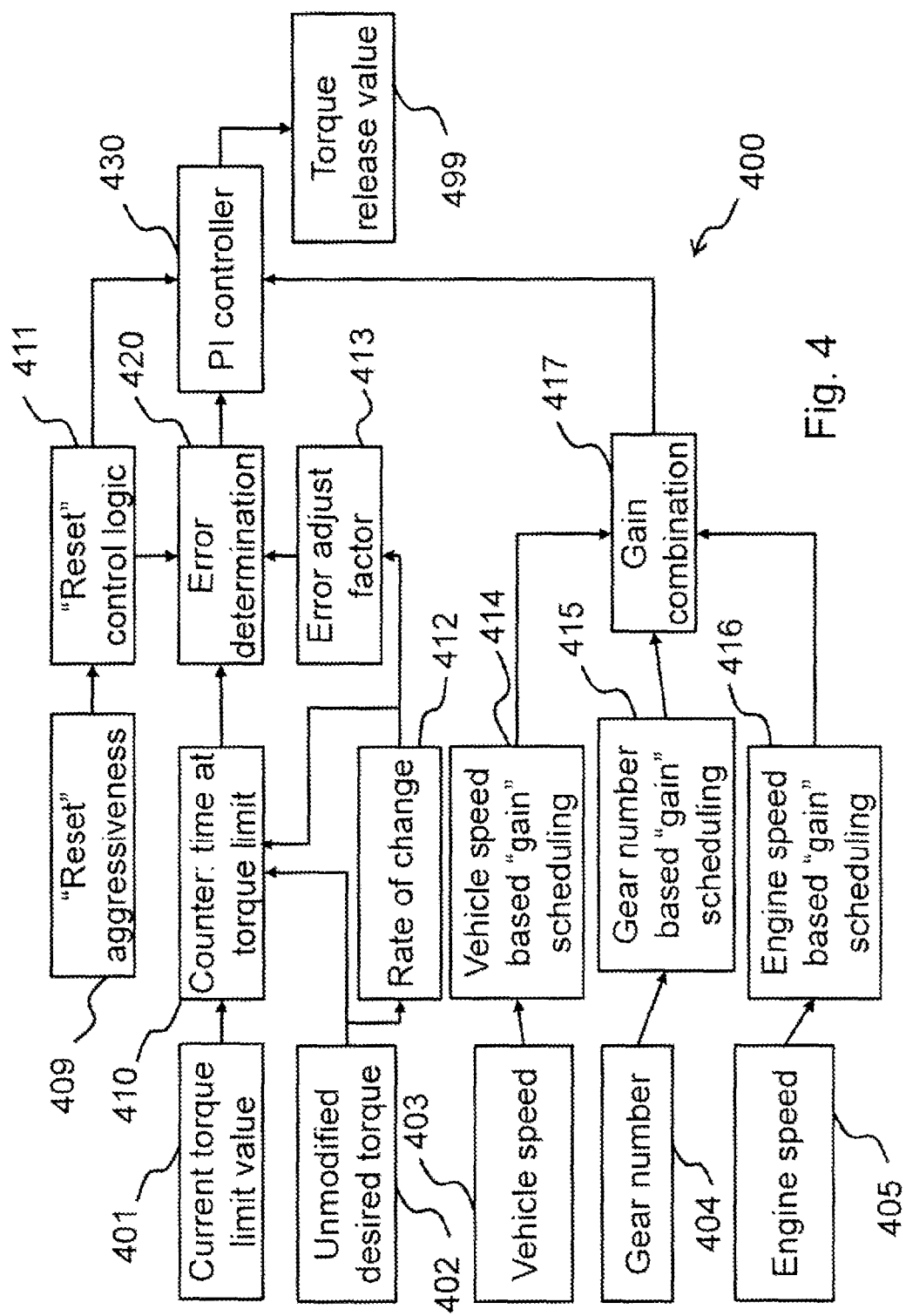

With reference to FIG. 4 there is illustrated a block diagram of exemplary CEM controls 400 which may be implemented in a control system such as the exemplary control systems described above in connection with FIGS. 1 and 2. Controls 400 receive a current torque limit value 401 as an input to a counter 410. Torque limit value 401 may be based upon or the same as final torque limit variable 398. Counter 410 is configured to count a time at which the commanded torque has been at a torque limit. This evaluation is further based upon unmodified desired torque input 402 which is provided to counter 410 and also to rate of change block 412 which is also provided to counter 410. Thus counter 410 may consider the unmodified desired torque (such as commanded torque) as well as the rate of change of the unmodified desired torque in counting the time at which the engine has been operating at a torque limit. It shall be further appreciated that the counting criteria may differ, for example, the time at which the torque value has been greater than or equal to 90 percent of the current torque limit value may also be utilized, as well as a number of other variations as would occur to one of skill in the art with the benefit of the present disclosure.

The output of counter 410 is provided to error determination block 420. Error determination block 420 also receives an input from reset control logic block 411 which in turn receives an input from reset aggressiveness block 409. Error determination block 420 also receives an error adjustment factor 413 input which in turn receives as an input rate of change block 412. Error determination block 420 outputs to PI controller 430. PI controller 430 also receives input from reset control logic block 411 and input from gain combination 417 as an input. PI controller 430 determines a torque release value as a function of these inputs and outputs to the result of this determination to torque release value variable 499. Gain combination block 417 receives input from vehicle speed based gain scheduling block 414 which in turn receives input from vehicle speed block 403. Gain combination 417 also receives as an input gear numbering based gain scheduling block 415 which in turn receives as an input gear number block 404.

Gain combination block 417 also receives an input from engine speed based gain scheduling block 416 which in turn receives as an input engine speed block 405.

Figure 5:
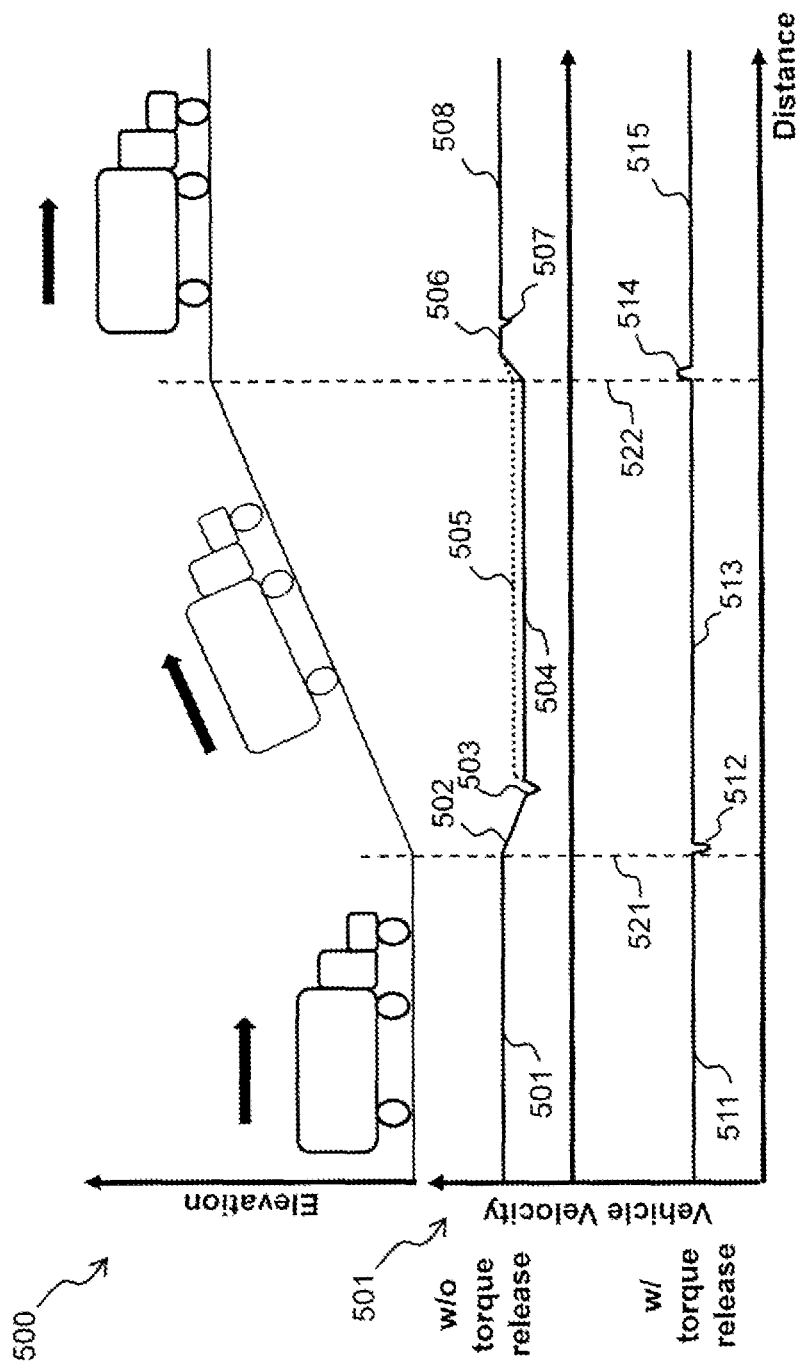
FIG. 5-8 are graphs illustrating aspects of operation of exemplary vehicle systems.

With reference to FIG. 5 there are illustrated two graphs 500 and 501. Graph 500 illustrates vehicle elevation as a function of distance traveled. As illustrated in graph 500 a vehicle such as vehicle 100 described above in connection with FIG. 1, proceeds from zero distance to distance 521 on a level grade at the first elevation. From distance 521 to distance 522 the vehicle encounters an increased grade and elevation gain which is depicted as substantially linear, but might also vary in a variety of other manners with as much variation as is present in the terrain over which the vehicle is traveling. From distance 522 to the greatest distance illustrated in FIG. 5, the vehicle is again on level grade at a higher elevation. Graph 501 illustrates vehicle velocity as a function of distance traveled both without a torque limit release functionality and with a torque limit release functionality. Without the torque release functionality vehicle velocity is substantially constant from zero distance to distance 521 as denoted by line segment 501. During this portion of the distance traveled the vehicle is on a level grade and is maintaining substantially constant engine speed and substantially constant torque. At distance 521 the vehicle encounters a hill and vehicle velocity drops over segments 502 and 503. Beginning at segment 503 a shift event occurs which further decreases vehicle velocity which then increases and stabilizes at the magnitude of line segment 504 which is less than velocity magnitude that would be present absent a shift event as represented by line segment 505. At line segment 506 the vehicle again encounters level grade and vehicle velocity stabilizes after a further shift event 507. At line segment 508 the vehicle continues to maintain a substantially constant velocity as travels over a substantially flat grade.

Vehicle operation with the torque release features differs from the operation described above. As illustrated in graph 501 vehicle velocity is substantially constant over line segments 511, 513, 515. Vehicle velocity encounters a relatively smaller decrease over line segment 512 and a relatively small increase over line segment 514. This smoothing of vehicle velocity is an example of enhanced drivability which generally refers to the ability of a vehicle system to respond to operator commands and provide desired operation. Further details of an exemplary torque release feature shall now be described in further detail.

Figure 6:
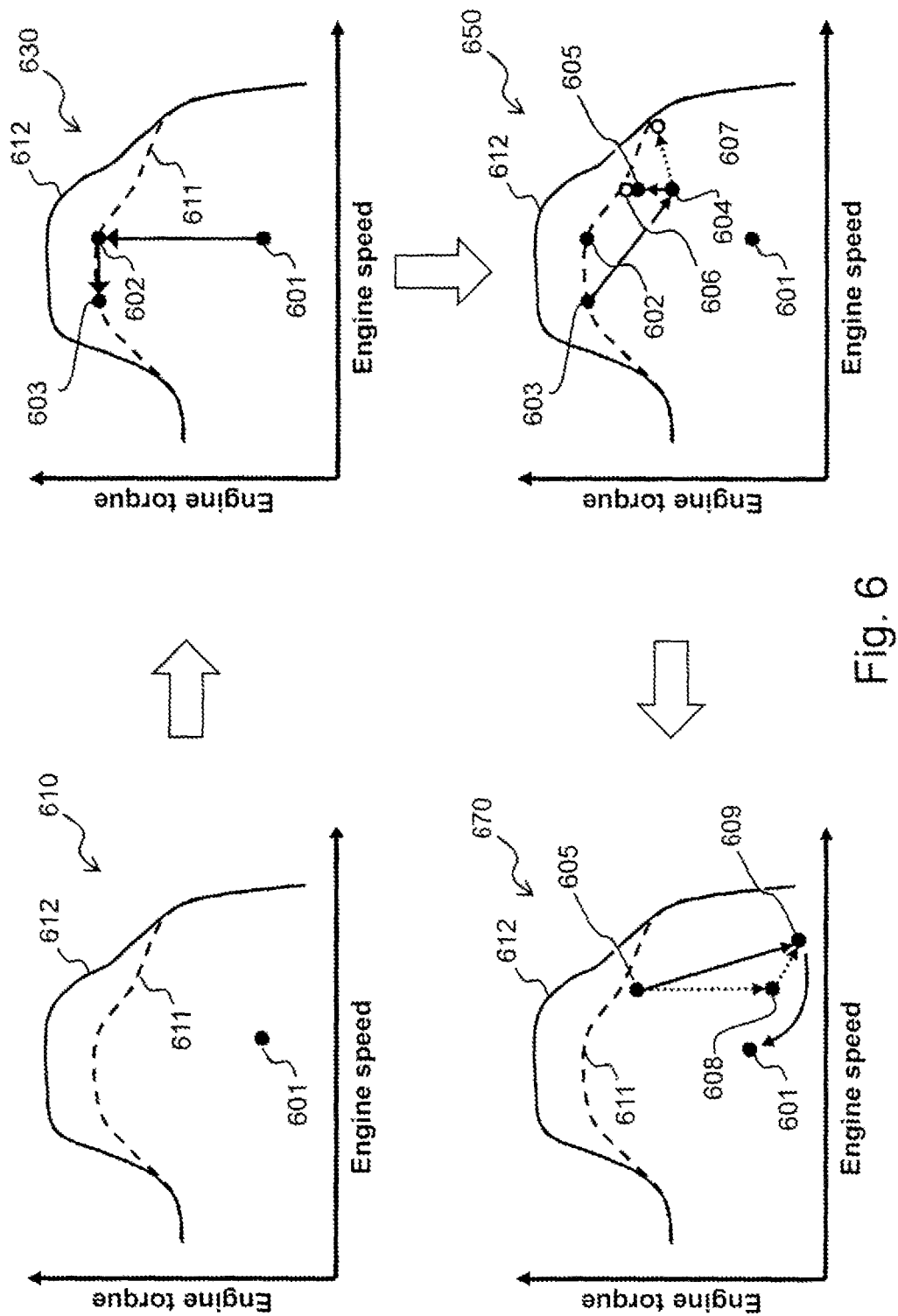

With reference to FIG. 6 there are illustrated graphs 610, 630, 650 and 670 depicting engine torque as a function of engine speed. Graphs 610, 630, 650 and 670 each illustrate a soft torque limit 611 and a hard torque limit 612. The soft torque limit may be determined in a variety of manners and may be calibratible by a service technician, owner or operator. The hard torque limit 612 is generally a function of the physical limits of the vehicle system, however it may also be a lower number to provide some operational safety margin. Operating point 610 is a first operating point, it being understood that reference to first operating point does not necessarily exclude the existence of prior operating points and is simply used for ease of reference to describe a starting point for the analysis disclosed herein.

As illustrated in graph 610 first operating point 601 is substantially below soft torque limit 611. As illustrated in graph 630 the engine operating point may increase in torque from first operating point 601 to second operating point 602. This may occur for example when the vehicle encounters a hill, when the operator demands greater torque output by pressing the accelerator, when the vehicle encounters a headwind or change in rolling resistance, or for a variety of other variations which shall be apparent to a person of skill in the art and the benefit of this disclosure. From operating point 602 the engine may further transition from operating point 602 to operating point 603 during which engine speed decreases. This decrease in engine speed is a function of the soft torque limit 611 which precludes an increase in torque sufficient to maintain engine speed.

With reference to graph 650 the engine operating point may proceed from point 603 to point 604 in which engine torque decreases and engine speed increases. This may occur, for example, during a transmission shift event. After the shift event the engine operating point may proceed from point 604 to point 605 or point 607. Under the scenario which the operating point transitions from point 604 to point 605, at point 605 although the hill or grade increase has ended the engine is unable to return to its target speed since it is constrained by soft torque limit 611. At the same time engine torque may be constrained to the magnitude of operating point 606 which may itself be less than desired. The transition may also occur from operating point 604 to operating point 607. In this scenario the engine is able to return to its target speed but with a reduced torque output which is less than desired. Either of operating points 605 or 607 may result in an individual vehicle speeding or transmission shift event.

With reference to graph 670 there are illustrated transitions and operating points which occur when the vehicle returns to a level grade. The vehicle operating point may transition from operating point 605 directly to point 609 or may transition from vehicle operating point to operating point 608 and then to operating point 609. From operating point 609 the vehicle may return to its original operating point 601.

Figure 7:
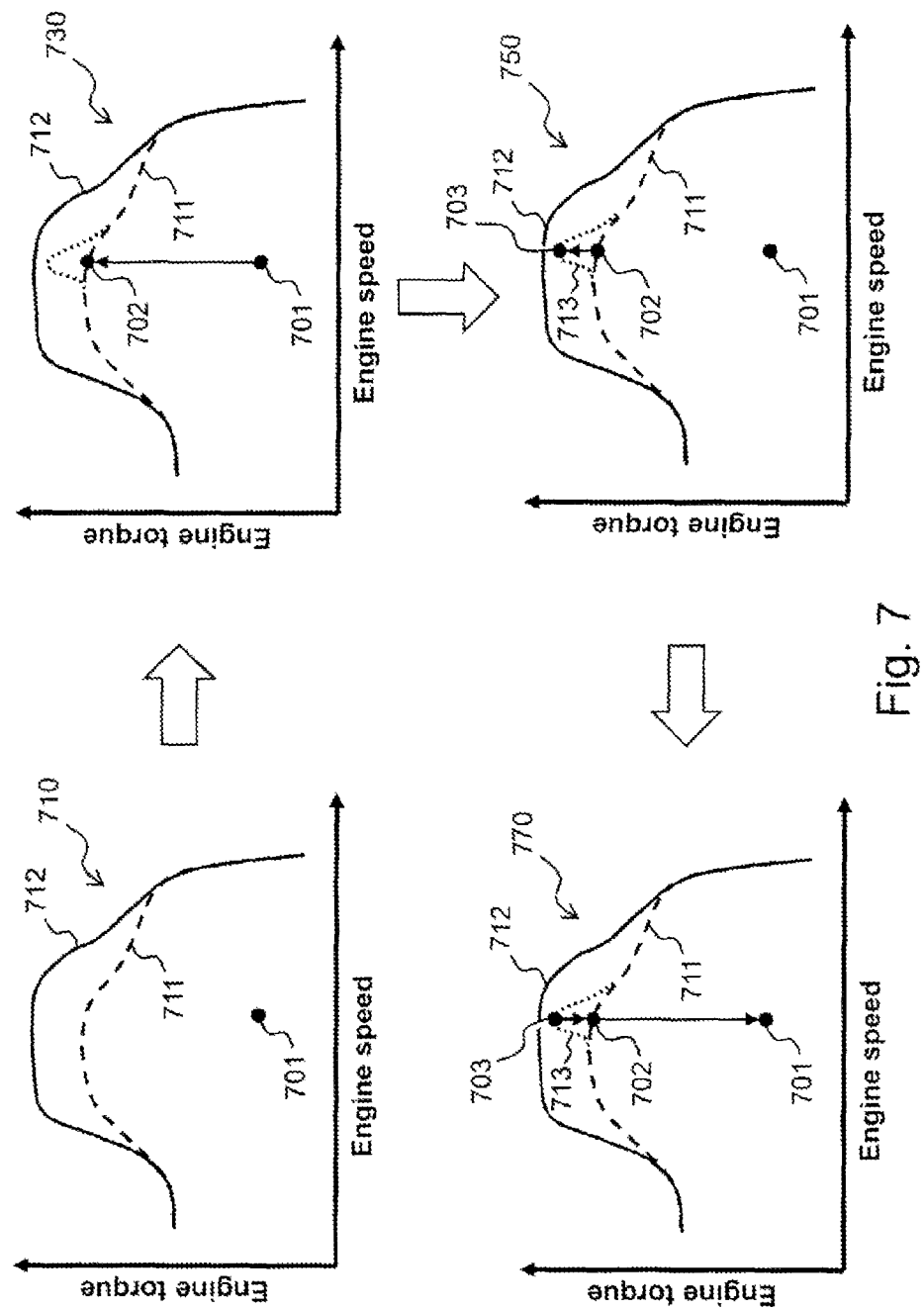

With reference to FIG. 7 there are illustrated graphs 710, 730, 750 and 770 which depict changes in engine operating points with a soft torque limit release function implemented. Graphs 710, 730, 750 and 770 illustrate an initial first operating point 701, a soft torque limit 711 and a hard torque limit 712. As depicted in graph 730 the engine operating point may transition from operating point 701 to operating point 702, for example, when the vehicle encounters a hill. At operating point 702 the engine operating point has reached the soft engine torque limit 711. When this occurs, a torque release functionality increases the soft torque limit according to modified torque limit curve 713.

As illustrated in graph 750, once the torque release function has modified the soft torque limit, vehicle torque may increase from operating point 702 up to operating point 703. This allows the vehicle to maintain engine speed by increasing torque. With reference to graph 770, when the vehicle returns to normal grade the engine operating point may return from operating point 703 to operating point 702 and then to operating point 701. After the transition from operating point 703 and operating point 702 the modified soft torque limit 713 may transition back to the original soft torque limit 711. As can be appreciated by comparing the graphs of FIGS. 6 and 7, the torque limit release function may avoid an undesired shift event, may mitigate vehicle lug, or both.

It shall be appreciated that a number of operating point adjustment and control techniques are contemplated. In certain forms the engine operating point may be adjusted by increasing engine torque above the un-modified soft limit. In certain forms the engine operating point may be adjusted by a combination of increasing engine torque above the un-modified soft limit and decreasing engine speed. Such adjustments may be determined based upon a weighted optimization of a demand responsiveness criterion and fuel consumption criterion. The weighted optimization criteria may be operator controllable based upon various different fuel economy and operational responsiveness criteria. The weighted optimization may also be dynamically adjusted during a vehicle operation based upon changed operator criteria or based upon the past operation of the vehicle and its impact relative to the established criteria. For example, the weighting afforded to fuel economy may be increased if recent operational history has moved away from a fuel economy target.

A number of torque limit adjustment techniques and control criteria are contemplated. These include both torque limit release criteria and torque limit reinstatement criteria as well as other types of torque limit adjustments and modifications. The torque limit adjustments may be based upon a predetermined relationship between a current operating point of the engine and a soft limit on engine torque. For example, the soft torque limit may be modified when the operating point is within a given magnitude or a given percentage of the limit. The torque limit adjustment may also be based upon a predicted future engine operating point. The predicted future operating may be based upon a computation, such as a mathematical derivative of an operating point curve, or linear or non-linear prediction based upon a plurality of recent operating points. The predicted future operating point may also be based upon global positioning system (GPS) information which may indicate changes in road grade, elevation or altitude. The predicted future operating point may also be based upon information of prior operation of the vehicle, for example, data relating to prior mission histories may be stored in a non-transitory computer readable medium and utilized to predict future operating points. In certain forms mission history data may be utilized in conjunction with distance traveled or mission time elapsed. In certain forms mission history data may be utilized in conjunction with GPS data. In certain forms the predicted future operating point may be based upon a predetermined road parameter specification such as a road grade specification. For example, the prediction may be based upon a road grade limit for a given elevation change. In certain forms the predicted future operating point may be based upon information from an inclinometer and/or a forward horizon terrain profile either alone or combined as a fused grade sensor value. The fused grade sensor may be determined as a weighted average of the information from the inclinometer and the forward horizon terrain profile.

Figure 8:
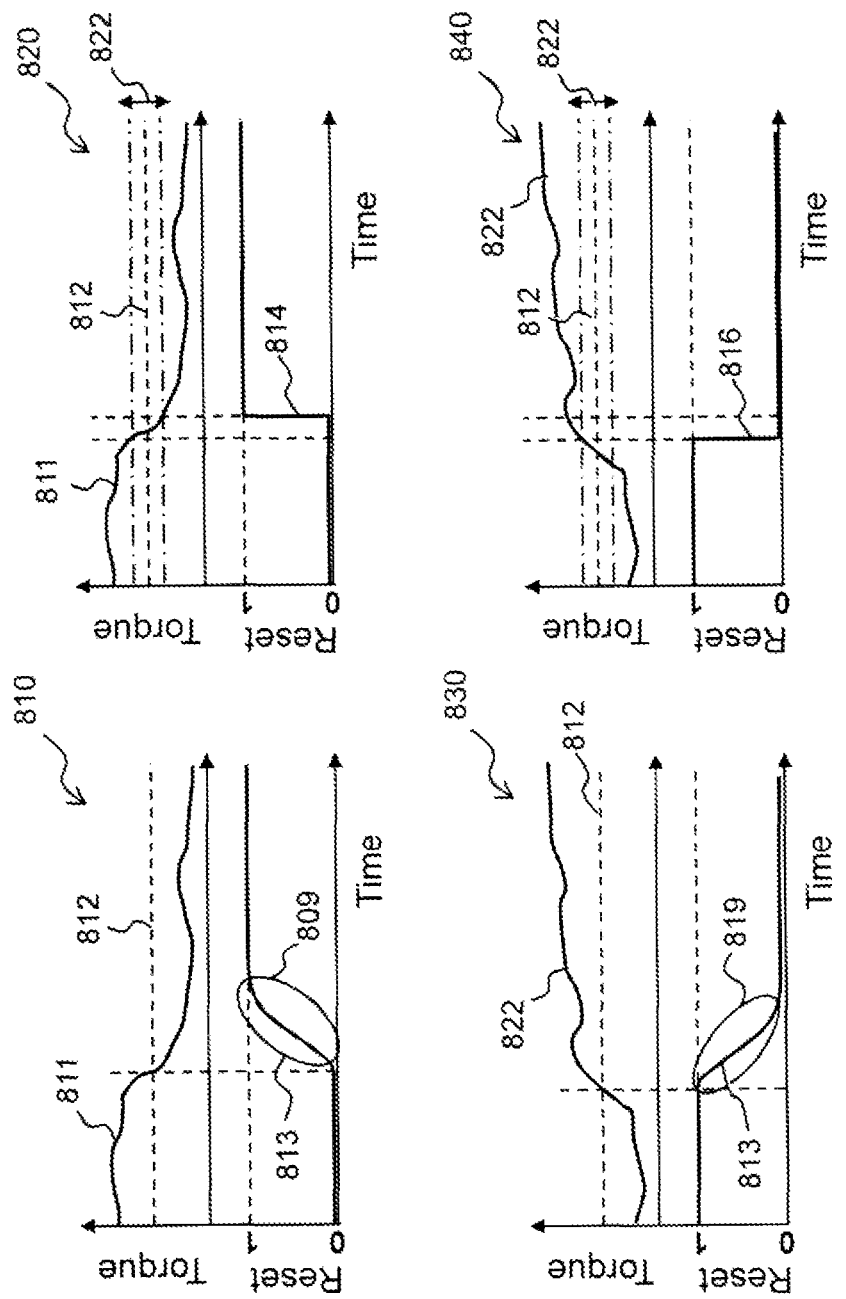

With reference to FIG. 8 there are illustrated graphs 810, 820, 830, and 840. Graph 810 illustrates a gentle or smooth reset functionality. Line 811 is the unmodified desired torque. Line 812 is the current torque limit. Line 813 is the reset function which includes a calibratible shape 809 to transition between reset mode zero and reset mode 1 as a non-step function. It should be appreciated that a variety of different calibratible shapes might be used including, for example, ramps, exponential functions, stair-step functions, as well as other alternatives as would occur to one skilled in the art with the benefit of the present disclosure. Graph 820 illustrates a discrete reset function as well as the hysteresis band 822. The reset function graph 820 occurs as a step function as illustrated by line 814. Graph 840 illustrates a transition from reset value 1 to reset value 0 as illustrated by line 815. Line 815 includes the calibratible shape 819 which may be any of the variations described above in connection with calibratible shape 809. With reference to graph 840 there is illustrated discrete reset described by line 816 which transitions discretely.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of controlling a vehicle system including an engine, a transmission, and a control system in operative communication with and structured to control operation of the engine and the transmission, the method comprising:
   determining an operating point of the engine, the operating point including an engine torque and an engine speed;
   evaluating a relationship between the operating point and a soft limit on engine torque;
   modifying the soft limit to permit operation outside a boundary of the un-modified soft limit, the modifying the soft limit being constrained by a hard limit on engine torque, the act of modifying the soft limit including
   determining a dynamic torque limit using estimated vehicle operation parameters and a feedback loop which adjusts the estimated vehicle operation parameters using actual system response information and feedback of the dynamic torque limit,
   determining a static torque limit using a predetermined table,
   and selecting the minimum of the static torque limit and the dynamic torque as an input for determining a value of the modified soft limit, the act of selecting the minimum occurring irrespective of an engine speed; and
   adjusting the operating point of the engine to increase engine torque above the boundary of the un-modified soft limit, based upon a weighted optimization of a demand responsiveness criterion and a fuel consumption criterion, the weighting of the fuel consumption criterion being dynamically adjustable;
   wherein the modifying and the adjusting are effective to at least one of mitigate a vehicle speed lug event and avoid a transmission shift event.

2. The method of claim 1 wherein the adjusting the operating point comprises a combination of increasing engine torque above the un-modified soft limit and decreasing engine speed.

3. The method of claim 1 further comprising reinstating the un-modified soft limit on engine torque based upon a reinstatement criterion.

4. The method of claim 1 wherein the modifying the soft limit is based at least in part upon a predetermined relationship between the operating point of the engine and the soft limit on engine torque.

5. A method of controlling a vehicle system including an engine, a transmission, and a control system in operative communication with and structured to control operation of the engine and the transmission, the method comprising:
determining an operating point of the engine, the operating point including an engine torque and an engine speed;
evaluating a relationship between the operating point and a soft limit on engine torque;
modifying the soft limit to permit operation outside a boundary of the un-modified soft limit, the modifying the soft limit being constrained by a hard limit on engine torque; and
adjusting the operating point of the engine to increase engine torque above the boundary of the un-modified soft limit,
wherein the modifying and the adjusting are effective to at least one of mitigate a vehicle speed lug event and avoid a transmission shift event, and
the modifying the soft limit is based upon a predicted future engine operating point and a dynamically adjustable weighted optimization of a demand responsiveness criterion and a fuel consumption criterion.

6. The method of claim 5 wherein the predicted future operating point is based at least in part upon information of a global positioning system.

7. The method of claim 5 wherein the predicted future operating point is based at least in part upon information of prior operation of the vehicle.

8. The method of claim 5 wherein the predicted future operating point is based at least in part upon a predetermined road parameter specification.

9. The method of claim 5 wherein the predicted future operating point is based at least in part upon information from an inclinometer.

10. The method of claim 5 wherein the predicted future operating point is based at least in part upon a forward horizon terrain profile.

11. The method of claim 5 wherein the predicted future operating point is based at least in part upon information from an inclinometer and a forward horizon terrain profile.

12. The method of claim 11 wherein the information from the inclinometer and the forward horizon terrain profile are utilized to determine a fused grade sensor value.

13. The method of claim 12 wherein the fused grade sensor value comprises a weighted average of the information from the inclinometer and the forward horizon terrain profile.

14. A vehicle system comprising:
an engine;
a transmission; and
a control system in operative communication with the engine and the transmission, the control system being structured to:
determine an operating point of the engine, the operating point including an engine torque and an engine speed,
evaluate a relationship between the operating point and a first limit on engine torque,
modify the first limit to permit operation outside a boundary of the un-modified first limit, modification of the first limit being constrained by a second limit on engine torque, a modified magnitude of the first limit being determined by selecting a lesser one of a static torque limit and a dynamic torque limit, the act of selecting the minimum being uninfluenced by an engine speed, the dynamic torque limit being determined using a control loop which adjusts estimated vehicle operation parameters using actual system response information and the value of the dynamic torque limit, the static torque limit being determined based upon a table of predetermined values, and
adjust the operating point of the engine to increase engine torque above the boundary of the un-modified first limit, based upon a balancing of a demand responsiveness criterion and fuel consumption criterion.

15. The system of claim 14 wherein the control system is structured to adjust the operating point of the engine by increasing engine torque above the un-modified first limit and decreasing engine speed.

16. The system of claim 15 wherein the control system is structured to adjust the operating point of the engine based upon a weighted optimization of the demand responsiveness criterion and the fuel consumption criterion.

17. The system of claim 14 wherein the control system is further structured to reinstate the un-modified first limit on engine torque based upon a predetermined criterion of the engine operating point.

18. The system of claim 14 wherein the control system is structured to modify the first limit based at least in part upon a predetermined relationship between the operating point of the engine and the first limit on engine torque.

19. The system of claim 14 wherein the execution of the instructions by the control system is effective to mitigate a vehicle speed lug event.

20. The system of claim 14 wherein the execution of the instructions by the control system is effective to avoid a transmission shift event.

21. A vehicle system comprising:
an engine;
a transmission; and
a control system in operative communication with the engine and the transmission, the control system being structured to:
determine an operating point of the engine, the operating point including an engine torque and an engine speed,
evaluate a relationship between the operating point and a first limit on engine torque,
modify the first limit to permit operation outside a boundary of the un-modified first limit, modification of the first limit being constrained by a second limit on engine torque, and
adjust the operating point of the engine to increase engine torque above the boundary of the un-modified first limit,
wherein the control system is structured to modify the first limit based upon a predicted future engine operating point and an operator adjustable weighted optimization of a demand responsiveness criterion and a fuel consumption criterion.

22. The system of claim 21 wherein the predicted future operating point is based at least in part upon one of information of a global positioning system, information of prior operation of the vehicle, a predetermined road parameter specification, information from an inclinometer, and a forward horizon terrain profile.

23. The system of claim 21 wherein the predicted future operating point is based at least in part upon a fused grade sensor value determined based upon information from an inclinometer and a forward horizon terrain profile.

24. A method comprising:
operating a vehicle system including an engine, a transmission, and a control system in operative communication with the engine and the transmission;
determining engine output information;
evaluating the engine output information relative to an adjustable engine output limit;
increasing the adjustable engine output limit based upon a first adjustment criterion subject to constraint by a non-adjustable engine output limit;
controlling the engine output to exceed the un-modified adjustable engine output limit; and
decreasing the adjustable engine output limit based upon a second adjustment criterion, wherein
the first adjustment criterion is determined using the lesser of a static torque limit and a dynamic torque limit without regard to an engine speed, the static torque limit being determined using information of a transmission gear, a road grade and a vehicle mass as inputs to a predetermined lookup table, and the dynamic torque limit being determined using estimated vehicle operation parameters, a vehicle acceleration limit, and adjusted vehicle operation parameters determined using a feedback loop which adjusts the estimated vehicle operation parameters using actual system response information and the dynamic torque limit.

25. The method of claim 24 wherein the engine output information comprises engine speed information and engine torque information.

26. The method of claim 24 wherein the adjustable engine output limit comprises a limit on engine torque as a function of engine speed.

27. The method of claim 24 wherein the increasing and controlling are effective to avoid a vehicle speed lug event.

28. The method of claim 24 wherein the first adjustment criterion comprises a current relationship between the engine output limitation and the adjustable engine output limit prior to the increasing.

29. The method of claim 24 wherein the predicted future engine output is based at least in part upon one of information of a global positioning system, information of prior operation of the vehicle, a predetermined road parameter specification, information from an inclinometer, and a forward horizon terrain profile.

30. The method of claim 24 wherein the predicted future engine output is based at least in part upon a combination of information from an inclinometer and a forward horizon terrain profile.

31. The method of claim 24 wherein the increasing and controlling are effective to avoid a transmission shift event.

* * * * *